United States Patent
Hogg

[11] 4,021,956
[45] May 10, 1977

[54] FISHING NET
[76] Inventor: John A. Hogg, 2225 S. 36th St., Galesburg, Mich. 49053
[22] Filed: Aug. 18, 1976
[21] Appl. No.: 715,228
[52] U.S. Cl. .................................. 43/12
[51] Int. Cl.² .......................... A01K 77/00
[58] Field of Search ................. 43/11, 12
[56] References Cited
UNITED STATES PATENTS

| | | | |
|---|---|---|---|
| 1,857,826 | 5/1932 | Slamen | 43/12 |
| 2,485,781 | 10/1949 | Schreiber et al. | 43/12 |
| 2,814,899 | 12/1957 | Brosius | 43/12 |

Primary Examiner—Warner H. Camp
Attorney, Agent, or Firm—Woodhams, Blanchard and Flynn

[57] ABSTRACT

A frame has crossed arm portions and has a resilient action such that the resilient effect will bring together the net supporting arms of the frame and manual compression of the handle will spread the arms apart. Net material depends from the arms, is opened into maximum receiving position upon suitable grasping and compression of the handle and is closed into a fish retaining condition by partial relaxation of the manual compression of the handle. Means are provided if desired for limiting the maximum distance the net supporting arms can separate from each other.

9 Claims, 4 Drawing Figures

FISHING NET

FIELD OF THE INVENTION

The invention relates to a collapsible fishing net and particularly to a type thereof having a built-in resiliency which tends to close the net into a partially collapsed condition but will respond to a manual grasping of the handle to open the same into fully operative position.

BACKGROUND OF THE INVENTION

Nets for assisting a fisherman to land a hooked fish have been long known and have been proposed in a very large number of varieties, shapes and forms. In all of these previous nets, however, insofar as I am informed, there have continued to exist, and have been tolerated, certain inconveniences and problems which have in most cases rendered their use somewhat less than wholly satisfactory and have in many cases been so extremely inconvenient as to induce many fisherman to forego their use in all cases excepting only those where such use is absolutely necessary. Foremost among these problems is size, in that a net construction having a rigid handle and net supporting frame requires space for carrying. They are sometimes carried on the back, sometimes hanging from a creel in the case of trout fisherman, or in the case of boat fishermen, they are often carried loose in the boat, are many times under foot and in the way when not needed and often fouled with other gear when they are needed. Often, too, such nets when carried on a fisherman's back or adjacent his creel may become engaged by brush or low tree branches which may exist along a river bank, if such fisherman is working along the shore either on the bank or in the river.

In an attempt to remedy this recognized difficulty, many collapsible fishing nets have been proposed, all of them directed in one way or another to providing collapsibility for the net in question, but these have often been so extremely complicated as to defeat the main purpose, namely convenience, for which they were designed.

Accordingly, the objects of the invention include:

1. To provide a collapsible fishing net of the manually handled type which will automatically collapse by resilient means into a compact structure and which will remain in such collapsed condition to enable said net to be easily carried in a jacket pocket or in a creel for maximum convenience.

2. To provide a fishing net, as aforesaid, in which said collapsing will be automatic in response to a resilience built into such net.

3. To provide a fishing net, as aforesaid, which may be grasped on its handle by the user and the manual compression of the handle by such simple act of grasping same will forthwith effect a transition of the net from storage condition to use condition.

4. To provide a fishing net, as aforesaid, which will be of very simple construction in order that it will be both economical to manufacture and reliable to use.

5. To provide a fishing net, as aforesaid, which in collapsed condition can easily go into the fisherman's jacket pocket or into his creel or which can be hung from his shoulder as desired.

6. To provide a fish net, as aforesaid, which will be sufficiently simple in construction to be economical in manufacture and which will also be of a sufficiently rugged construction as to provide for safe and reliable use under the most adverse fishing conditions, whether trout fishing, stream fishing, ocean fishing or otherwise.

Other objects and purposes of the invention will be apparent to persons acquainted with apparatus of the general type upon reading the following disclosure and inspection of the accompanying drawings.

SUMMARY OF THE INVENTION

Figure 1:
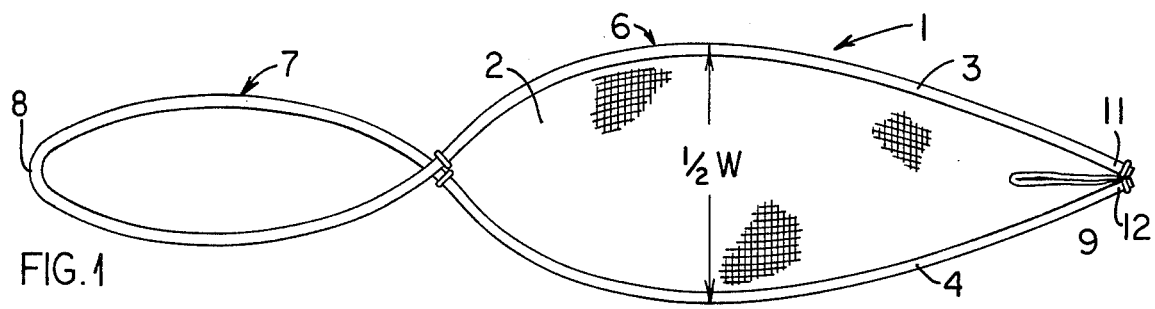
FIG. 1 is a top view of the fishing net embodying the invention.

The invention is carried out by providing a frame structure having crossed frame members with pivot means at the handle end thereof and a net suspended from said frame structure at the other end thereof. Resilient means are provided constantly urging the net into closed position which resilient means are preferably bight means connecting the frame pieces and simultaneously providing said pivot structure at the handle end thereof. Thus, the normal resilience of the frame structure, preferably at said bight, constantly urges the net into collapsed position and manual grasping thereof by the handle portion will compress said handle portion and simultaneously separate the net portion by which to move the structure into operating or fish-receiving position.

DETAILED DESCRIPTION

Referring to the drawings, there is provided a fishing net having a frame structure 1 from which is suspended a net 2. Said frame structure comprises crossed members 3 and 4 which are arranged to provide a net portion 6 and a handle portion 7. Preferaby the crossed members are proportioned so that the net portion 6 is substantially larger than the handle portion 7. Said crossed members are connected in the handle portion at the bight end 8 remote from the net portion. Said connection is resilient and such resilience is sensed to urge the members 3 and 4 in the net portion 6 thereof towards each other.

Figure 3:
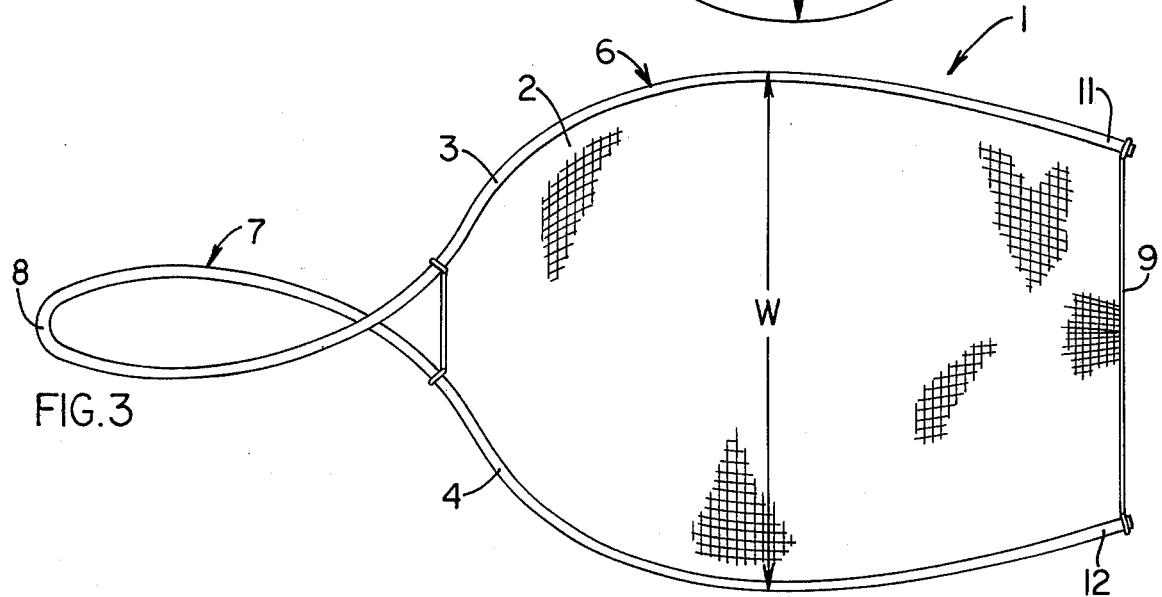
FIG. 3 is a top view of the fishing net in operating or fish-receiving position.

The net 2 may be of any convenient material and may be fixed to and suspended from the members 3 and 4 in any convenient and conventional manner. It should be noted, however, that for reasons further discussed hereinafter the net need not be as deep as is normal with conventional fishing nets but instead its depth D may be about the same, or even slightly less, than its width W when the same is in open or operating position. For example, D may be 9 inches and W 10 inches. Limit means 9 (FIG. 3) such as a cord or chain are preferably provided connecting the extreme ends 11 and 12 of the members 3 and 4 for limiting the distance said ends can separate from each other.

In use, the resilience of the bight 8 will normally hold the net structure in the collapsed position shown in FIG. 1. In such collapsed condition, the same may be easily carried in a creel or in a suitable pocket. When the same is to be used, it may be grasped by the handle, the same being squeezed sufficiently to compress the handle and thereby separate the net portions of the frame members 3 and 4, whereby to move the parts into the position of FIG. 3 with the net portions of the frame members 3 and 4 separated from each other the maximum distance permitted by the limit means 9. The net is now open and ready for use in a normal manner.

Figure 2:
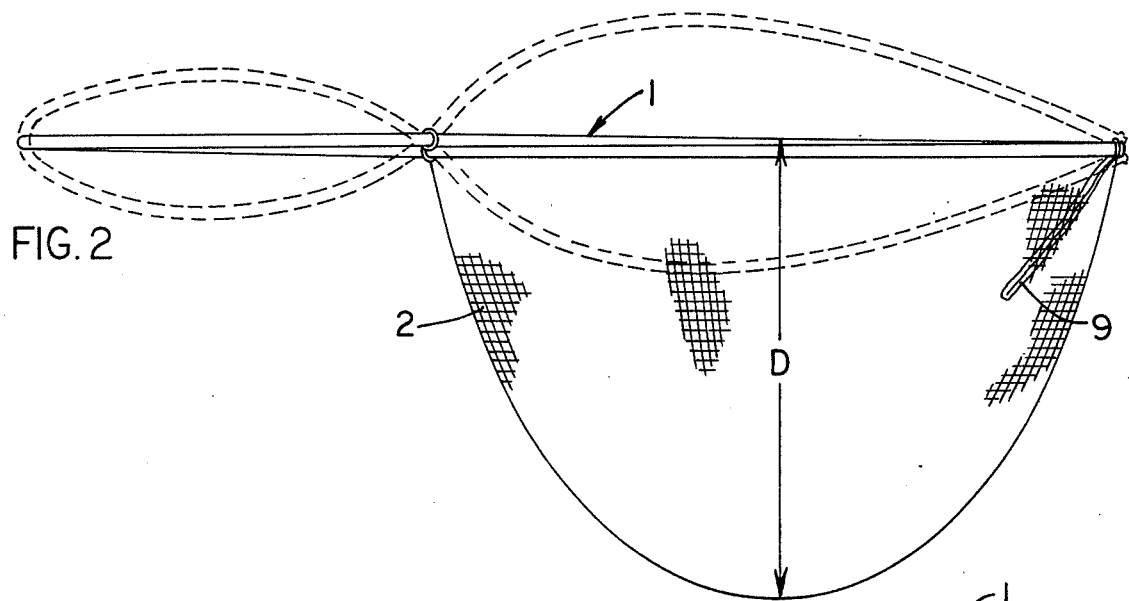
FIG. 2 is a side view of the device shown in FIG. 1.

When a fish is received into the net, the pressure on the handle 7 may be lessened sufficiently to permit the net to return to its FIG. 1 position. The mouth thereof substantially diminishes in size, such as to a width of one-half W, whereby to make it as difficult for the fish to escape as though it were in a much deeper net with a fixed frame. Alternately if desired, the frame may be rotated, as illustrated in broken lines in FIG. 2, about its longitudinal axis whereby to fully lock the fish into the net and thereby rendering its escape impossible.

MODIFICATION

Figure 4:
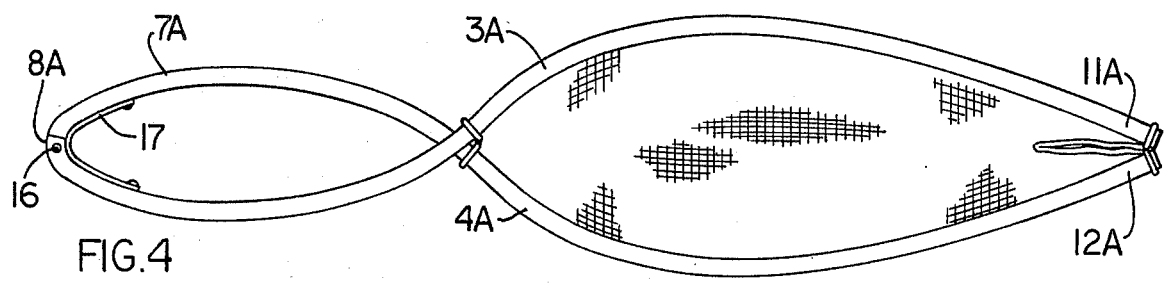
FIG. 4 is a top view of a modification showing the frame members only.

Referring to FIG. 4, there is shown a modification which further illustrates the mechanical functioning of the device.

FIG. 4 shows only the frame structure in a position corresponding to that of FIG. 1. Here, however, the frame members 3A and 4A are formed of rigid material, such as aluminum tubing or extrusion, and are pivotally connected at the bight 8A by pivot means 16. A leaf spring 17 is fixed, as by riveting, between the two components of the handle portion 7A and stressed to urge the tips 11A and 12A of the frame members towards each other, preferably into contact with each other. The net, not shown, is fixed to said frame members in the same manner as above described in connection with FIGS. 1–3 and the operation of the net is likewise the same.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A collapsible manually manipulatable fishing net comprising:
   a pair of crossed frame members;
   means pivotally relating first adjacent ends of said members and a flexible net suspended from said members between the point of crossing thereof and the other respective ends thereof; and
   resilient means continuously urging said last-named ends toward each other.

2. The device of claim 1 wherein said members are curved so as to provide portions adjacent said first respective ends which are substantially parallel with each other and also to provide portions between said point of crossing and said respective second ends which are substantially parallel with each other.

3. The device of claim 2 wherein said first respective ends are positioned closely adjacent each other and said point of pivoting is adjacent and operatively related to said first respective ends.

4. The device of claim 3 wherein said resilient means comprises resilient means associated with said first respective ends for constantly urging apart the portions of said frame members adjacent said first respective ends.

5. The device of claim 3 wherein said first respective ends blend continuously into each other as a single piece of material.

6. The device of claim 5 wherein said resiliency is derived from the resiliency of the material connecting said first respective ends.

7. The device of claim 4 including means for limiting the distance apart said second respective ends are permitted to move.

8. The device of claim 4 wherein said resilient means comprises separate resilient means affixed to said frame members adjacent said first respective ends and biased to continuously urge same apart.

9. The device of claim 8 wherein said resilient means is a leaf spring affixed to said frame members adjacent the pivotal connection of said first respective ends.

* * * * *